United States Patent [19]

Tsuchie

[11] Patent Number: 5,064,035
[45] Date of Patent: Nov. 12, 1991

[54] COASTER BRAKE PROVIDED WITH REVERSING FUNCTION

[76] Inventor: Kimihiro Tsuchie, 35-1, Kinugasa Tenjinmori-cho, Kita-ku, Kyoto-shi, Japan

[21] Appl. No.: 554,990

[22] Filed: Jul. 16, 1990

[30] Foreign Application Priority Data

Oct. 25, 1988 [JP] Japan .................................. 63-268814

[51] Int. Cl.$^5$ ........................ F16D 41/24; F16D 67/02
[52] U.S. Cl. ......................................... 192/6 R; 192/5
[58] Field of Search ........................ 192/5, 6 R, 6 A; 280/259, 261

[56] References Cited

U.S. PATENT DOCUMENTS

| 4,598,805 | 7/1986 | Tomozawa | 192/6 R |
| 4,650,049 | 3/1987 | Stephens | 192/6 R |
| 4,727,965 | 3/1988 | Zach et al. | 192/6 A |
| 4,758,013 | 7/1988 | Agrillo | 280/242 |

Primary Examiner—Allan D. Herrmann
Assistant Examiner—Andrea Pitts

[57] ABSTRACT

The coaster brake of this invention is provided with a clutch cone screw-fitted to a driving body which is driven by pedals, to be axially movable in correspondence with the driving body's turning direction, a brake cone supported through a clutch mechanism which is not turnable in the forward direction, but which allows its turning in the reverse direction, and a brake members which is operated to apply brake on the hub shell by the aforementioned clutch cone moving to approach the aforementioned brake cone side, when the driving body is turned in a reverse direction. When the hub shell is turning in the forward direction, the brake action may be exhibited by applying to the driving body reverse rotation similarly top conventional coaster brake. Besides, the aforementioned brake cone is rotatable in the reverse direction by means of the clutch mechanism and as the driving body is subjected to a reverse turning, when the hub shell is not turning in the forward direction, the aforementioned brake cone will turn in the reverse direction integrally together with the driving body, the clutch cone and the brake member and in concert with the hub shell; thus, the coaster brake mechanism operates as a reverse driving mechanism.

2 Claims, 3 Drawing Sheets

COASTER BRAKE PROVIDED WITH REVERSING FUNCTION

BACKGROUND OF THE INVENTION

1. Field of the Invention

The present invention relates to a coaster brake provided with reversing function adaptable for use with vehicles like bicycles which are propelled by pedals.

2. Description of the Prior Art

The hitherto-known coaster brake for bicycles is provided inside a hub shell with a clutch cone which is screw-engaged with a driving body driven by pedals, to be movable in its axial direction in correspondence with the turning direction of the driving body, a brake cone which operates a brake member by its cooperative action with the clutch cone, when the aforementioned clutch cone approaches it in accompaniment with reverse rotation of the driving body and a brake member which operates to apply brake on the hub shell through cooperative action of the aforementioned clutch cone and brake cone at the time of reverse turning of the driving body. When the pedals are turned in the forwarding direction, their turning force is transmitted from the driving body to the hub shell through a member composing the brake, causing the hub shell to turn in the forward direction, and then, when the turning of the pedals is stopped, the hub shell becomes freely turnable, to be able to run by inertia. When a turning force is applied on the pedals in the reverse direction, the clutch cone moves to the brake cone side, causing the brake member to operate, thereby applying brake on the hub shell. This braking action will be exhibited, even when the hub shell is at a standstill or when it is turning in the reverse direction; in whichever case, brake may be applied by making use of strong leg force. An example of actual structure of coaster brakes which exhibits such an action is described in a preferred embodiment later described.

By the way, a bicycle is premised on the assumption that its rider goes ahead while taking his balance and he need not go backwards by operating the pedals; for this reason, ordinary bicycle's driving device is designed exclusively for forward motion. On the other hand, for the handicapped, the aged or for infants who can not take balance well, multi-wheeled vehicles which do not fall down like a bicycle to which auxiliary wheels are attached or tricycles are used. With such a multi-wheeled vehicle if it is made practicable to go backward by operating the pedals while riding on the vehicle, this will lend itself to turning around or to circumvention of hurdles. Moreover, provision of a brake which makes use of strong leg strength like a coaster brake is further advantageous.

However, since the conventional coaster brake is of a construction, such that brake is applied, as the reverse turning force is imposed on the pedals, it was impossible to answer the demand for enabling backward motion by stepping pedals, while applying this construction to multi-wheeled vehicles as it is.

SUMMARY OF THE INVENTION

This invention has been realized with attention paid to this problem and it is the object of this invention to provide a coaster brake which not only permits application of brake, making use of strong leg force, similarly as with usual bicycles, but which is provided with a function as a drive for going backwards, to be adaptable for multi-wheeled vehicles like tricycles.

It is still another object of the present invention to provide a coaster brake of simpler, less expensive and reliable construction with reduced backlash.

In order to achieve the above-mentioned objects, the coaster brake provided with reverse drive function of this invention is equipped with a clutch mechanism which does not permit the brake cone to turn in the forward direction, but which can permit it to turn in the reverse direction. Accordingly, when the hub shell is turning in the forward direction, the braking action is exhibited similarly as in the conventional coaster brakes. But the aforementioned brake cone is made turnable in the reverse direction by means of the aforementioned clutch mechanism; and if the driving body is turned in reverse direction, when the hub shell is not turning in the forwarding direction, the aforementioned brake cone will turn in the reverse direction, together with the hub shell, so that the coaster brake mechanism acts as a backing drive mechanism. In the following, preferred embodiments of this invention are described with reference to the accompanying drawings:

DETAILED DESCRIPTION OF THE PREFERRED EMBODIMENTS

Figure 1:
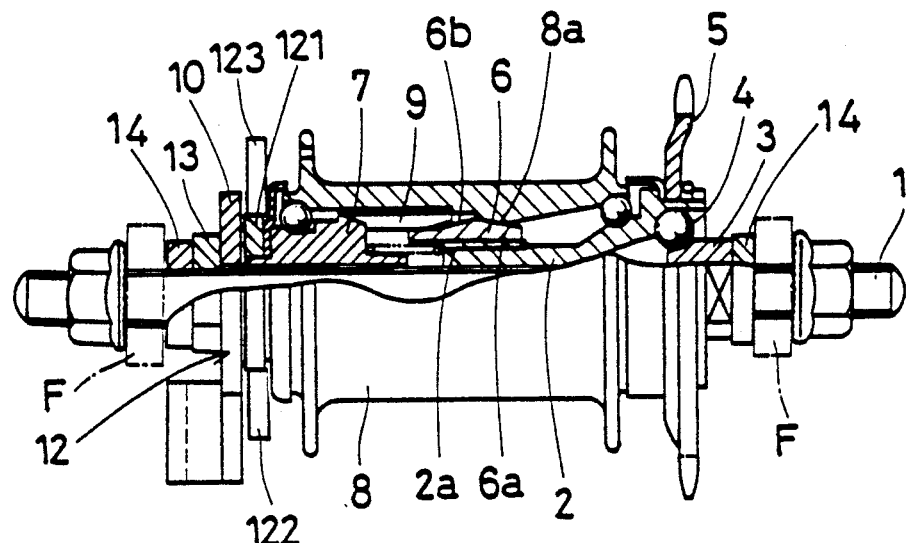
FIG. 1 is a back view of an embodiment shown partly broken.

Referring to FIG. 1, 1 denotes a hub shaft fixed to the fork end part F of a vehicle's frame; 2, a driving body rotatably supported through a ball 4 by a ball pusher 3 fixed on the hub shaft 1; on this driving body 2, a small gear is fixed, with a chain spanned between it and a pedal side large gear not shown in this figure. Numeral 6 designates a clutch cone screw-fitted on the right hand screwed portion 2a of the tip part of the driving body 2; 7, a brake cone located at some distance apart from the clutch cone 6; 8, hub shell; 9, brake shoe placed between the clutch cone 6, the brake cone 7 and hub shell 8 and connected to the brake cone; and 10, brake arm mounted on the frame.

Before explaining this invention, a conventional coaster brake is described. In a conventional coaster brake, the aforementioned brake cone 7 is connected to the brake arm 10 by an appropriate means, such that it cannot make a turn relative thereto. Now, as the small gear 5 rotates in the forward direction (clockwise direction as seen from the right side in the drawing), the driving body 2 also turns in the forward direction; then, the clutch cone 6 is drawn toward the driving body 2 side, causing its outer tapered portion 6a to be thrust onto the inner tapered portion 8a of the hub shell 8; as a result, the hub shell 8 makes a turn in the forward direction and, then, the bicycle will go forward. As the forwarding turning of the small gear 5 is stopped, the connection between the aforementioned tapered portions 6a and 8a is released, thereby bringing about a state such that the hub shell 8 can make a free turn, thus permitting the bicycle to run by inertia. Then as a reverse direction turning force is given the small gear, the driving body 2 makes a reverse turn, to push the clutch cone 6 to the brake cone 7 side at left; then, the outer tapered portion 6b of the clutch cone 6 pushes the brake shoe 9 thereby expanding it in the radial direction. As a consequence, the brake shoe 9 is pressed onto the inner surface of the hub shell 8, thereby applying brake.

It should be noted that among coaster brakes which have been made practically usable, there are available those of somewhat different internal constructions from the aforementioned like one that has a disc shape brake member corresponding to the brake shoe, for example; however, they are same in the basic structural means of arresting the turning effort of the hub shell by the brake cone which is not turnable.

Figure 2:
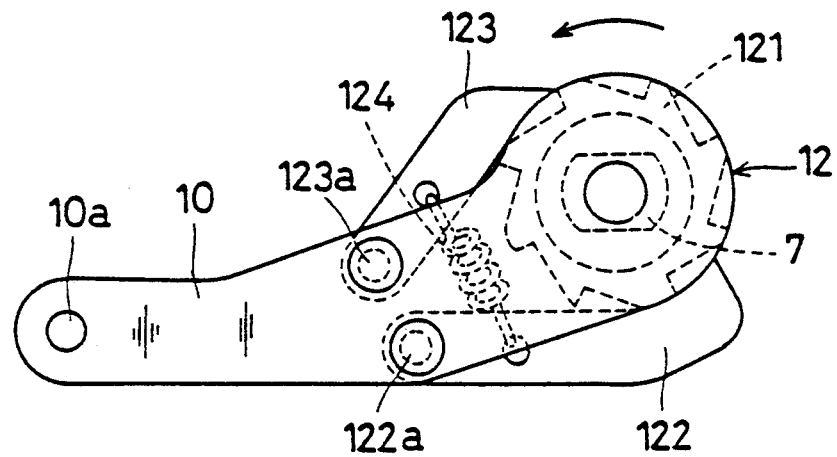
FIGS. 2 and 3 are side and plan views of a clutch mechanism of the aforementioned embodiment.
Figure 3:
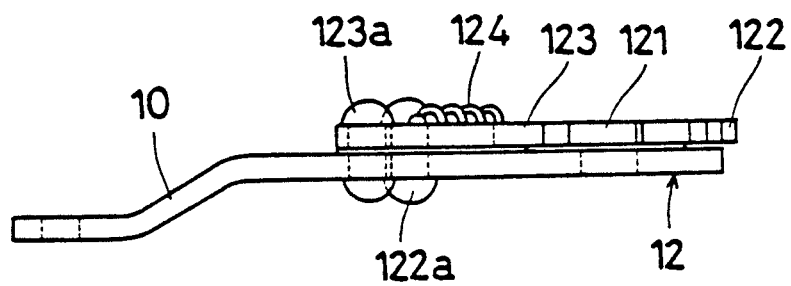

Now, turning back to the explanation of this invention, 12 denotes clutch mechanism; 13, set nut; and 14, lock nut; the clutch mechanism 12 is provided as a ratchet type unidirectional clutch consisting of a ratchet gear 121, pawls 122 and 123, a spring 124, etc. The brake cone 7 is mutually engageably fitted into the ratchet gear 121, to make integral turn therewith. The pawls 122 and 123 are mounted on the brake arm 10 at fulcrums 122a and 123a and so urged by a spring 24, to have their tips engaged with the ratchet gear 121. On this account, the ratchet gear 121 cannot turn in the arrow direction of FIG. 2 or in the forward direction, but is turnable in the opposite or reverse direction. The brake arm 10 is fixed on the frame, making use of a hole 10a.

With the above-described composition, as a backing direction turning force is given the small gear 5 while the vehicle is making forward motion, brake will be applied similarly as with the above-described usual coaster brake, for the ratchet gear 121 and thus, the brake cone 7 can not turn in the forward direction. And it is capable of making run by inertia likewise as the conventional one.

Then as a backward direction turning force is further given to the small gear 5 in the state of the hub shell 8's rotation being stopped, a reverse direction turning force will be given the brake cone 7, too, while the brake shoe 9 remains being pressed onto the inner surface of the hub shell 8. And the ratchet gear 1219 turns in the reverse direction, while pushing up the pawls 122 and 123; therefore, the brake cone 7 will turn in the reverse direction together with the ratchet gear 121, to let the hub shell 8 turn, causing the bicycle to go backward.

Figure 4:
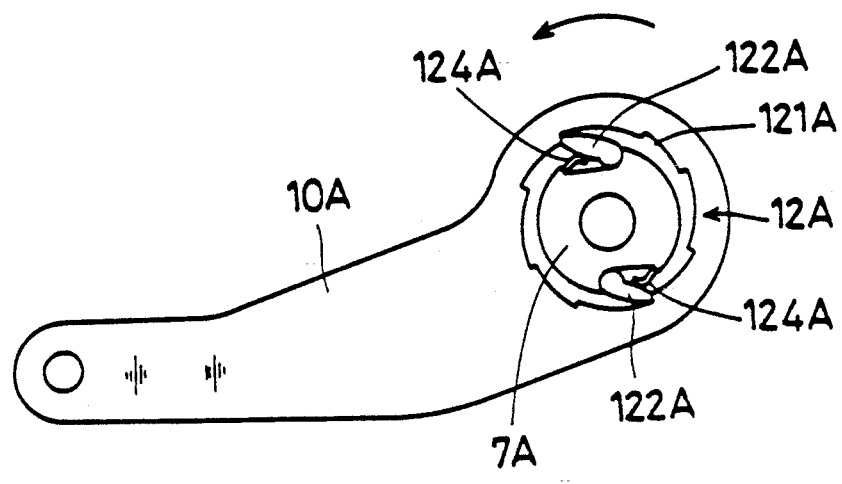
FIG. 4 is a side view of a clutch mechanism of another embodiment.

FIG. 4 shows an example of a clutch mechanism being a unidirectional clutch composed by forming a ratchet gear 121A on the brake arm 10A and providing the brake cone 7A with pawls 122A and springs 124A; its action is similar to the one above described. As such clutch mechanisms, other unidirectional clutches like roller clutches, for example, may be employed.

Figure 5:
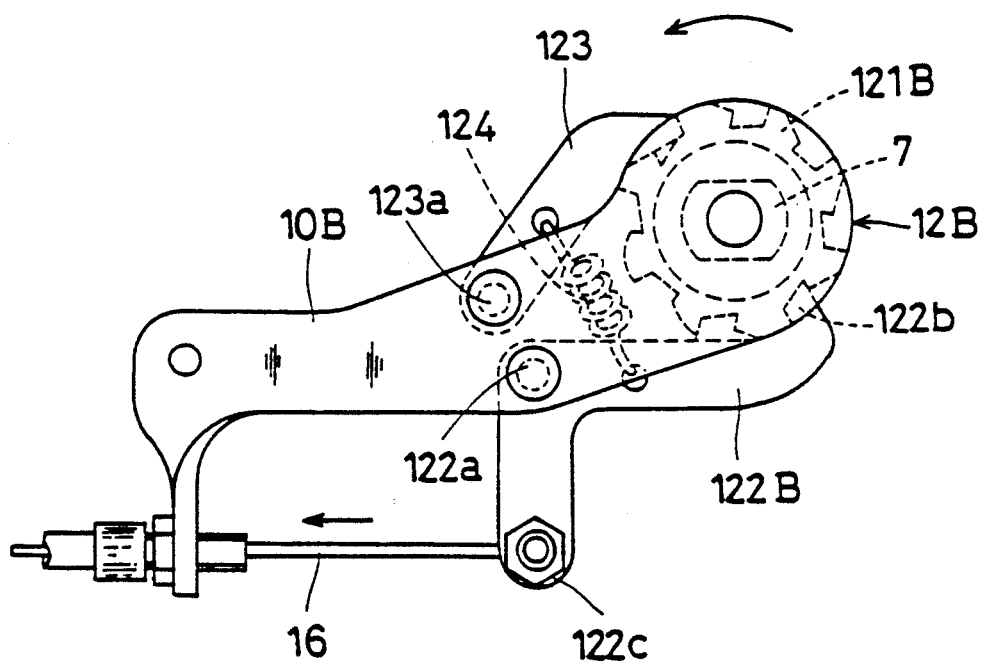
FIG. 5 a side view of a clutch mechanism of still another embodiment.

FIG. 5 illustrates use of a clutch mechanism 12B which permits manual control of its backing direction turning. Thus in place of the ratchet gear 121 of FIG. 2, use is made of a ratchet gear 121B having a gear of a shape which can stop turning in the reverse direction; then, a pawl 122B having a tip portion 122b which meshes with said gear is provided and to the rear end portion 122c of the pawl 122B, a wire 16 which is operated by the rider is connected. In the state as shown in the drawing, the pawls 123 and 122B are both meshed with the ratchet gear 121B; therefore, the ratchet gear 121B can not move in either direction; this is quite the same as in the case of conventional coaster brakes. As the wire 16 is drawn in the arrow direction, the pawl 122B turns in the clockwise direction, causing its tip 122b to come off the ratchet gear 121B, thereby permitting the ratchet gear 121B to turn in the reverse direction; thus, a state of being capable of exhibiting the function as a reverse drive is brought about.

Figure 6:
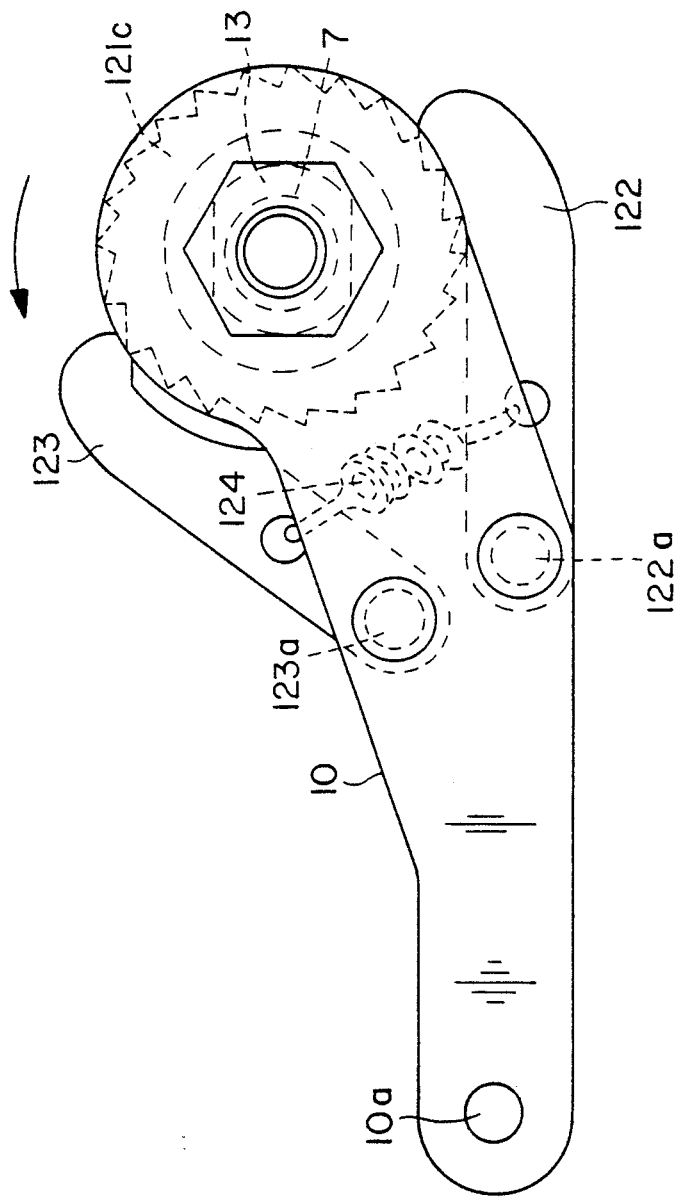
FIG. 6 is a side view of a clutch mechanism of a third embodiment of the present invention.

FIG. 6 illustrates a third embodiment of a clutch mechanism of the present invention which provides additional advantages over the other two embodiments. This third embodiment is essentially constructed as is the first embodiment shown in FIG. 2; however, the two claws 122 and 123 mesh with the teeth of the ratchet gear 121C by half a pitch divergence. In other words, when the claw 122 is at the peak of a tooth on the gear 121C, the claw 123 is halfway between two teeth on the gear 121C. With such a construction, the number of teeth of the gear 121C can effectively and practically be doubled to reduce backlash without making the ratchet gear larger. Also, the spring 124 is provided between the two claws 122 and 123. Since the claws 122 and 123 are offset by half a pitch, the two claws 122 and 123 do not reach the peaks of the teeth of the ratchet gear 121C simultaneously. As a result, the distance between the claws 122 and 123 at any given time is shorter than in the other embodiments and the amount the spring 124 is extended becomes less. Therefore, the necessary pressing force against the gear 121C can be obtained and the resistance which occurs when the gear 121C rotates reversely and the spring 124 is caused to extend can be reduced. Furthermore, since the spring 124 is caused to extend less, the reliability of the spring and the longevity of the spring can be increased, while reducing the wear on the gear 121C.

In addition to the above, the surface of each tooth of the gear 121C which engages with the claws 122 and 23 are formed such that it inclines backward further than a radial direction of the of the gear 121C. As a result, the force applied to the tooth of the gear 121C when the claws 122 and 123 are meshed faces inwardly more than the direction of a tangent of the gear 121C. Thus, the teeth of the gear 121C are less likely to be broken and small size teeth can be utilized which can sustain a large controlling force. As a result, it is possible to increase the number of teeth of the gear 121C and reduce backlash without making the gear larger in diameter.

What is claimed is:

1. A coaster brake of a construction provided with a clutch cone screw-fitted to a driving body, to be axially movable in correspondence with the turning direction f the driving body and a brake cone which actuates a brake member through its cooperative action with said clutch cone, when said clutch cone approaches it in accompaniment with said driving body being turned in a reverse direction such that brake is applied on the hub shell by operating said brake member, when said driving body is turned in said reverse direction, wherein there is provided a unidirectional clutch comprising a ratchet mechanism which does not permit said brake cone to turn in a forward direction, but can permit its turning in said reverse direction, and wherein the ratchet mechanism of the unidirectional clutch comprises: a ratchet gear having teeth, two claws which are displaced relative to each other by half of a pitch of the ratchet gear which engage with the teeth of the ratchet gear and a spring provided between said two claws for biasing said two claws into engagement with said teeth of said ratchet gear.

2. The coaster brake of claim 1 wherein a surface of each tooth f said ratchet gear which engages with the two claws is formed such that it inclines backward more than a radial direction of said ratchet gear.

* * * * *